US012311785B2

(12) United States Patent
Yamamoto

(10) Patent No.: US 12,311,785 B2
(45) Date of Patent: May 27, 2025

(54) VEHICLE DRIVE SYSTEM

(71) Applicant: TOYOTA JIDOSHA KABUSHIKI KAISHA, Toyota (JP)

(72) Inventor: Akira Yamamoto, Yokkaichi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 101 days.

(21) Appl. No.: 18/474,710

(22) Filed: Sep. 26, 2023

(65) Prior Publication Data

US 2024/0157800 A1  May 16, 2024

(30) Foreign Application Priority Data

Nov. 14, 2022 (JP) ................. 2022-181551

(51) Int. Cl.
*B60L 3/04* (2006.01)
*B60L 50/60* (2019.01)

(52) U.S. Cl.
CPC ............. *B60L 3/04* (2013.01); *B60L 50/60* (2019.02)

(58) Field of Classification Search
CPC ...... B60L 3/04; B60L 50/60; B60L 2240/547; B60L 2250/16; B60L 3/0046
USPC ...................................... 307/10.1
See application file for complete search history.

(56) References Cited

U.S. PATENT DOCUMENTS

| 2018/0222323 | A1* | 8/2018 | Ikeyama | ............... B60L 3/0007 |
| 2019/0061654 | A1* | 2/2019 | Tsuji | ....................... B60R 16/03 |
| 2020/0189395 | A1* | 6/2020 | Takahashi | ................. B60L 3/04 |
| 2020/0290478 | A1 | 9/2020 | Nakagawa | |
| 2021/0104955 | A1* | 4/2021 | Yamaguchi | ............. H02M 7/48 |

FOREIGN PATENT DOCUMENTS

| JP | 2017-143714 A | 8/2017 |
| JP | 2018-007426 A | 1/2018 |
| JP | 2020-150722 A | 9/2020 |

* cited by examiner

Primary Examiner — Rexford N Barnie
Assistant Examiner — Swarna N Chowdhuri
(74) Attorney, Agent, or Firm — Sughrue Mion, PLLC

(57) ABSTRACT

In a vehicle drive system, in at least either of a case where a first ECU receives a collision detection signal or a case where an interlock line is disconnected, the first ECU controls a relay such that electrical connection between a battery and a motor device is disconnected. The motor device includes an electric motor for traveling, a PCU, a second ECU, and a backup power supply. The PCU includes one or more capacitors. When the interlock line is disconnected, the second ECU is activated by electric power supplied from the backup power supply activated along with the disconnection. Under the condition that the second ECU does not receive, from the first ECU, a discharge command to discharge residual charge or that a determination that a collision occurs is made, the second ECU controls the PCU such that the PCU executes a discharge control.

5 Claims, 3 Drawing Sheets

VEHICLE DRIVE SYSTEM

CROSS-REFERENCE TO RELATED APPLICATION

This application claims priority to Japanese Patent Application No. 2022-181551 filed on Nov. 14, 2022, incorporated herein by reference in its entirety.

BACKGROUND

1. Technical Field

This disclosure relates to a vehicle drive system applied to an electrified vehicle.

2. Description of Related Art

Japanese Unexamined Patent Application Publication No. 2018-007426 (JP 2018-007426 A) discloses an electrified vehicle. This electrified vehicle includes a power control unit (PCU) configured to control electric power supplied to an electric motor for traveling, and an electronic control unit (MG-ECU) configured to control the PCU. The PCU includes a converter, an inverter, and first and second capacitors. When the electronic control unit receives a collision detection signal from a collision detection sensor, the electronic control unit executes a discharge control for controlling the converter or the inverter such that the converter or the inverter discharges electric charge in the first and second capacitors.

SUMMARY

With the technology described in JP 2018-007426 A, when residual charge inside the power control unit included in a motor device is discharged at the time when a collision of the electrified vehicle is detected, it is possible to bring the power control unit into a state where the residual charge is removed at the time of rescue after the collision. In the meantime, in a case where the electronic control unit configured to execute the discharge control cannot receive a collision detection signal under the influence of the collision, for example, the electronic control unit cannot execute the discharge control at the time of the collision. As a result, when an operator starts operation for the rescue after the collision, the residual charge remains in the motor device.

This disclosure is accomplished in view of the above problems, and an object of this disclosure is to provide a vehicle drive system that can more surely discharge residual charge in a motor device before an operator starts operation at the time of rescue after a collision.

A vehicle drive system according to this disclosure includes a battery, a motor device, a relay, and a first electronic control unit. The motor device is connected to the battery. The relay is configured to switch between electrical connection and disconnection of the battery with the motor device. The first electronic control unit is configured to control the relay such that the electrical connection is disconnected, in at least either a case where the first electronic control unit receives a collision detection signal indicative of detection of a collision in an electrified vehicle or a case where an interlock line to be disconnected by an operator to stop power supply from the battery to the motor device is disconnected. The motor device includes an electric motor for traveling, a power control unit, a second electronic control unit, and a backup power supply. The power control unit includes one or more capacitors and is configured to control electric power to be supplied from the battery to the electric motor for traveling. The second electronic control unit is configured to control the power control unit. In a case where the interlock line is disconnected, the second electronic control unit is activated by electric power supplied from the backup power supply activated along with the disconnection. Under the condition that the second electronic control unit does not receive, from the first electronic control unit, a discharge command to discharge residual charge in the one or more capacitors or that a determination that the collision occurs is made, the second electronic control unit controls the power control unit such that the power control unit executes a discharge control by which the residual charge is discharged.

The interlock line may include a service plug to be removed by the operator for the disconnection or a to-be-cut part to be cut by the operator for the disconnection.

The interlock line may be placed in a power train compartment in which a power train including the motor device is stored.

The vehicle drive system may further include a voltage sensor configured to detect a residual voltage in the one or more capacitors. When the residual voltage is equal to or less than a threshold, the second electronic control unit may not execute the discharge control.

The vehicle drive system may further include a voltage sensor configured to detect a residual voltage in the one or more capacitors. The electrified vehicle may include a notification device. When the residual voltage is equal to or less than a threshold, the second electronic control unit may control the notification device such that the notification device notifies that the residual charge is removed.

With this disclosure, it is possible to discharge residual charge in the motor device more surely by use of the backup power supply before the operator starts operation, with the disconnection of the interlock line, performed at the time of rescue, as a trigger.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
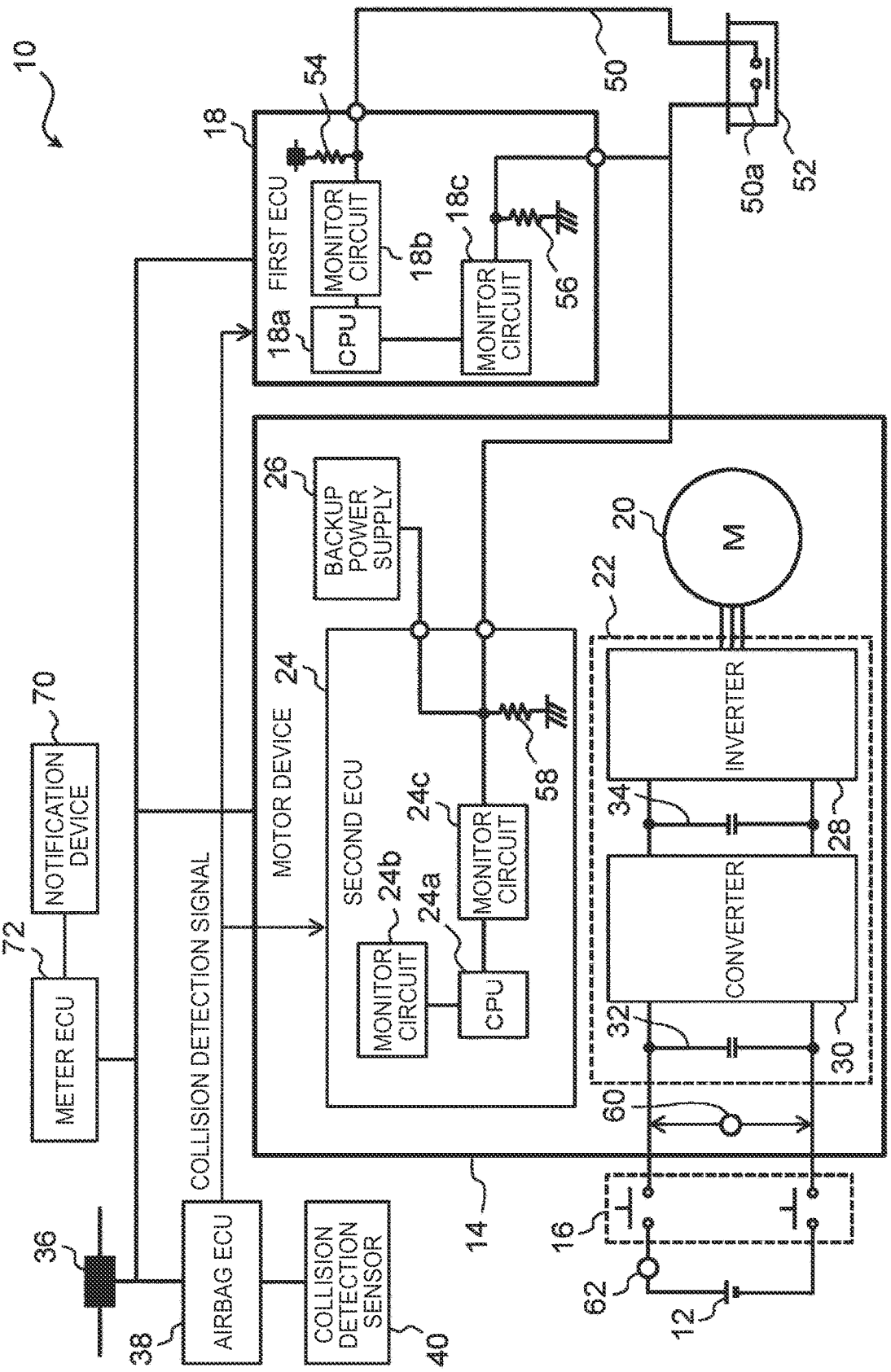
FIG. 1 is a view illustrating an example of the configuration of a vehicle drive system according to an embodiment.

An embodiment of this disclosure will be described below with reference to the accompanying drawings. Note that elements common in the drawings have the same reference sign, and redundant descriptions are omitted or simplified.

1. System Configuration

FIG. 1 is a view illustrating an example of the configuration of a vehicle drive system 10 according to the embodiment. The vehicle drive system 10 illustrated in FIG. 1 is applied to an electrified vehicle. The electrified vehicle is, for example, a battery electric vehicle (BEV). Note that the electrified vehicle to which the "vehicle drive system" according to this disclosure may be, for example, a hybrid electric vehicle (HEV), a plug-in hybrid electric vehicle (PHEV), or a fuel cell electric vehicle (FCEV).

The vehicle drive system 10 drives the electrified vehicle. The vehicle drive system 10 includes a battery 12, a motor device 14, a system main relay (SMR) 16, and a first electronic control unit (a first ECU) 18.

Electric power for the electrified vehicle to travel is stored in the battery 12. The battery 12 is connected to the motor device 14 via the SMR 16. The SMR 16 (corresponding to a "relay" according to this disclosure) switches between electrical connection and disconnection of the battery 12 with the motor device 14. More specifically, the SMR 16 is provided between the battery 12 and a PCU 22 (described later).

As illustrated in FIG. 1, the motor device 14 includes an electric motor 20, a power control unit (PCU) 22, a second electronic control unit (a second ECU) 24, and a backup power supply 26.

The electric motor 20 drives the electrified vehicle by electric power supplied from the battery 12. The PCU 22 controls electric power supplied from the battery 12 to the electric motor 20. More specifically, the PCU 22 includes an inverter 28, a converter 30, and capacitors 32, 34.

The inverter 28 includes a plurality of switching elements and convers direct-current power of the battery 12, supplied via the converter 30, into three-phase alternating-current power and supplies it to the electric motor 20. The converter (DC-DC converter) 30 includes, for example, a reactor and two switching elements, and the converter boosts up the voltage of the battery 12 and supplies it to the inverter 28. The capacitor 32 is connected in parallel to between the battery 12 and the converter 30 and smoothes a direct voltage supplied from the battery 12. The capacitor 34 is connected in parallel to between the converter 30 and the inverter 28 and smoothes the direct voltage boosted by the converter 30. Note that the number of capacitors included in the "power control unit" according to this disclosure is not necessarily limited to two and may be one or three or more.

Further, the vehicle drive system 10 includes an interlock line 50. The interlock line 50 is disconnected by an operator who requests cut-off of power supply from the battery 12 to the motor device 14. The disconnection of the interlock line 50 by the operator is performed at the time of inspection or maintenance of the electrified vehicle or rescue after a collision. The interlock line 50 is configured such that respective voltage levels of interlock signals input into the first ECU 18 and the second ECU 24 change in response to whether or not the interlock line 50 is disconnected, for example.

In order that the operator can disconnect the interlock line 50, the interlock line 50 includes a service plug 52, for example. More specifically, the service plug 52 is provided to be attachable to and detachable from a connector portion 50a placed on the interlock line 50. When the service plug 52 is removed by the operator, the interlock line 50 is brought into a disconnected state. Alternatively, the interlock line may include a to-be-cut part to be cut by the operator using a tool, instead of the service plug 52. The to-be-cut part may be set at the same position as a part where the service plug 52 illustrated in FIG. 1, for example. When the service plug 52 or the to-be-cut part is provided, the operator can easily disconnect the interlock line 50 at the time of rescue.

More specifically, in one example illustrated in FIG. 1, the interlock line 50 extends from an auxiliary battery 36 and branches after the interlock line 50 passes through a resistor 54 and the service plug 52. A first branched part of the interlock line 50 passes through a resistor 56 and reaches a ground point. A second branched part of the interlock line 50 passes through a resistor 58 and reaches a ground point. The resistors 54, 56 are provided in the first ECU 18, and the resistor 58 is provided in the second ECU 24. The auxiliary battery 36 is a direct-current power supply of 12 V, for example.

Further, broadly speaking, an arrangement place for the interlock line 50 is not limited and may be inside a vehicle cabin of the electrified vehicle, for example. With that in mind, in the present embodiment, the interlock line 50 is placed inside a power train compartment. The power train compartment is separated from the vehicle cabin, and a power train of the electrified vehicle, including the motor device 14, is stored in the power train compartment. More specifically, at least the service plug 52 (or the to-be-cut part) of the interlock line 50 is placed inside the power train compartment. Hereby, the operator can easily disconnect the interlock line 50 at the time of rescue.

The first ECU 18 and the second ECU 24, and an airbag ECU 38 and a meter ECU 72 (both described later) operate by electric power supplied from the auxiliary battery 36. The ECUS 18, 24, 38, 72 are communicably connected to each other via an in-vehicle network such as a controller area network (CAN).

The first ECU 18 includes a central processing unit (CPU) 18a, determines a target torque for the electric motor 20 based on information on the depression amount of an accelerator pedal of the electrified vehicle, a vehicle speed, and so on, and transmits a command to the second ECU 24.

Further, the first ECU 18 includes a monitor circuit 18b configured to monitor a collision detection signal. The collision detection signal is transmitted to the first ECU 18 from the airbag ECU 38 configured to control the operation of an airbag, for example. More specifically, the airbag ECU 38 transmits a collision detection signal when the airbag ECU 38 detects a collision of the electrified vehicle by use of a collision detection sensor 40.

Further, the first ECU 18 includes a monitor circuit 18c configured to monitor an interlock signal transmitted via the interlock line 50. The monitor circuit 18c detects whether or not the interlock line 50 is disconnected, based on an interlock signal the voltage level of which changes in response to whether or not the interlock line 50 is disconnected.

The second ECU 24 includes a CPU 24a and controls the PCU 22 such that the target torque instructed by the first ECU 18 is achieved. More specifically, the second ECU 24 generates a pulse signal to be transmitted to the inverter 28 and the converter 30 based on the target torque and controls ON and OFF of switching elements of the inverter 28 and the converter 30 of the PCU 22.

Further, the collision detection signal is also transmitted to the second ECU 24 from the airbag ECU 38, for example. Accordingly, similarly to the first ECU 18, the second ECU 24 also includes a monitor circuit 24b configured to monitor the collision detection signal.

Further, in the vehicle drive system 10 illustrated in FIG. 1, the interlock line 50 is also led into the second ECU 24. Accordingly, similarly to the first ECU 18, the second ECU 24 also includes a monitor circuit 24c configured to monitor the interlock signal transmitted via the interlock line 50. Thus, with the vehicle drive system 10, disconnection of the interlock line 50 can be also detected by the second ECU 24 as well as the first ECU 18. This leads to improvement in robustness related to execution of discharge of residual charge in the capacitors 32, 34 as will be described later.

The backup power supply 26 is a backup capacitor, for example, and is provided in the motor device 14 and configured to be capable of supplying electric power to the second ECU 24. More specifically, during activation of the vehicle drive system 10, the backup power supply 26 is always charged with electric power supplied from the auxiliary battery 36. The backup power supply 26 is configured to be activated when disconnection of the interlock line 50 is detected by the monitor circuit of the second ECU 24. Accordingly, at the time of the disconnection, even when power supply from the auxiliary battery 36 to the second ECU 24 is stopped due to a collision of the electrified vehicle, the second ECU 24 can be activated by electric power supplied from the backup power supply 26. In addition, electric power necessary for the second ECU 24 to cause the PCU 22 to execute a "discharge control A" (described later) can be stored in the backup power supply 26.

Further, the vehicle drive system 10 includes a voltage sensor 60. The voltage sensor 60 is connected in parallel to between the SMR 16 and the capacitor 32 and detects the voltage of the battery 12. The voltage sensor 60 is provided inside the motor device 14 as an example. The second ECU 24 can detect a residual voltage Vc of the capacitors 32, 34 by use of an output from the voltage sensor 60 when the SMR 16 is turned off (that is, when electrical connection between the battery 12 and the motor device 14 (the PCU 22) is disconnected).

Further, the vehicle drive system 10 includes a current sensor 62. The current sensor 62 detects a current of the battery 12. In one example illustrated in FIG. 1, the current sensor 62 is placed in a high-voltage line between the SMR 16 and the battery 12 but may be placed in a low-voltage line between the SMR 16 and the battery 12, for example.

Further, the electrified vehicle to which the vehicle drive system 10 is applied includes a notification device 70, and an ECU (for example, a meter ECU) 72 configured to control the notification device 70. The notification device 70 can notify the operator of information at the time of rescue after a collision of the electrified vehicle. More specifically, the notification device 70 includes, for example, a display device. The display device is, for example, a meter panel provided in an instrument panel of the electrified vehicle. Further, instead of or in addition to the display device, the notification device 70 may include a speaker.

2. Operation of System
2-1. Operation at Collision

When the first ECU 18 receives a collision detection signal from the airbag ECU 38, the first ECU 18 turns off the SMR 16. That is, the first ECU 18 controls the SMR 16 such that electrical connection between the battery 12 and the motor device 14 is disconnected. As a result, the motor device 14 (more specifically, the PCU 22) including the capacitors 32, 34 is electrically separated from the battery 12.

Further, when the second ECU 24 receives a collision detection signal from the airbag ECU 38, the second ECU 24 controls the PCU 22 such that the PCU 22 performs the "discharge control A." The "discharge control A" as used herein is executed to discharge residual charge in the capacitors 32, 34.

The discharge control A is executed by controlling the inverter 28 or the converter 30 included in the PCU 22, for example. More specifically, the second ECU 24 controls each switching element in the inverter 28 such that the electric motor 20 operates at a magnetic field angle allowing the electric motor 20 to consume electric power without generating a torque, for example, so that the residual charge can be discharged. Further, for example, when the second ECU 24 turns on one of two switching elements of the converter and turns off the other one, the residual charge in the capacitor 32 or 34 can be discharged through a current path passing through the switching element thus turned on and a reactor.

Note that the collision detection signal that triggers the discharge control A may be transmitted from the airbag ECU 38 to the second ECU 24 via the first ECU 18, instead of the example in which the collision detection signal is directly transmitted from the airbag ECU 38 to the second ECU 24.

2-2. Problem about Discharge Control A

By executing the discharge control A at the time when a collision of the electrified vehicle is detected, it is possible to bring the motor device 14 (the PCU 22) into a state where no residual charge remains at the time of rescue after the collision. However, the discharge control A may not be executable at the time of a collision because of the following factor. The factor includes a state where power supply from the auxiliary battery 36 to the second ECU 24 is not performable due to disconnection caused by the collision, for example. Further, the factor includes a state where the second ECU 24 cannot receive a collision detection signal due to a factor caused by the collision, for example. The state where the second ECU 24 cannot receive a collision detection signal occurs, for example, when power supply from the auxiliary battery 36 to the airbag ECU 38 is not performable due to breakage of the airbag ECU 38 or disconnection, or when the communication from the airbag ECU 38 stops.

In a case where the discharge control A is not executable at the time of a collision as described above, residual charge remains inside the motor device 14 when the operator starts operation at the time of rescue after the collision.

2-3. Operation at Rescue

In view of the abovementioned problem, in the present embodiment, the second ECU 24 (more specifically, the CPU 24a) is configured such that, in a case where the interlock line 50 is disconnected, the second ECU 24 (more specifically, the CPU 24a) is activated by electric power supplied from the backup power supply 26 activated along with the disconnection. Under the condition that the second ECU 24 does not receive, from the first ECU 18, a "discharge command" to discharge residual charge in the capacitors 32, 34, the second ECU 24 controls the PCU 22 such that the PCU 22 executes the discharge control A.

In addition, in a case where the interlock line 50 is disconnected, when the first ECU 18 can operate by power supply from the auxiliary battery 36, the first ECU 18 executes the following process. That is, the first ECU 18 turns off the SMR 16. With such a process, even in a case where the SMR 16 cannot be turned off at the time of a collision, the SMR 16 can be more surely turned off at the time of rescue after the collision.

Note that, in the present embodiment, a control executed by the first ECU 18 to turn off the SMR 16 is executed both in a case where the first ECU 18 receives a collision detection signal and in a case where the interlock line 50 is disconnected. However, the control may be executed only either in a case where the first ECU 18 receives a collision detection signal or in a case where the interlock line 50 is disconnected.

Further, in a case where the interlock line 50 is disconnected, the first ECU 18 transmits the discharge command to the second ECU 24.

Figure 2:
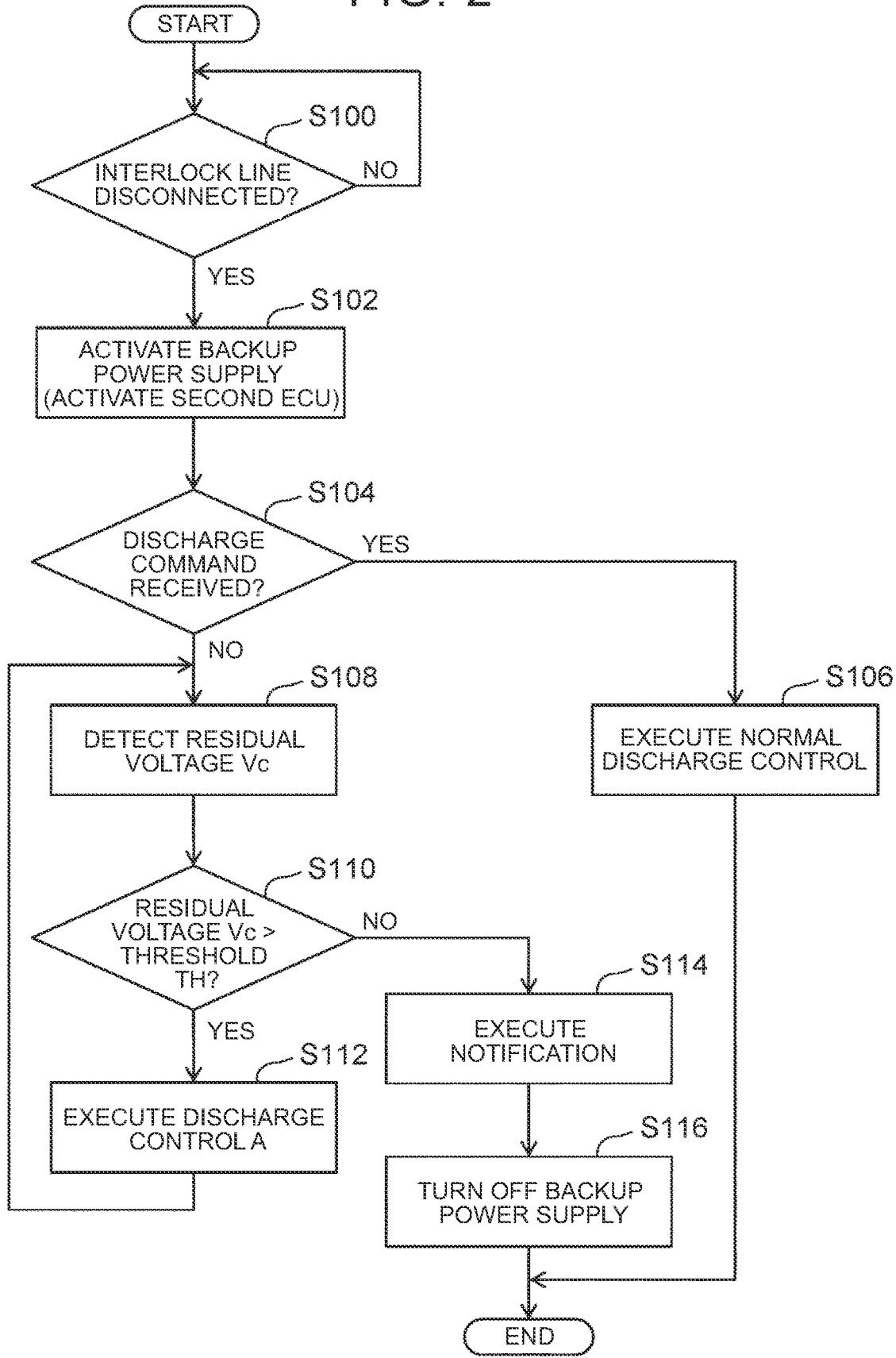
FIG. 2 is a flowchart illustrating an example of the procedure of the operation at the time of rescue according to the embodiment.

FIG. 2 is a flowchart illustrating an example of the procedure of the operation at the time of rescue according to the embodiment. The operation illustrated in this flowchart is performed by the motor device 14 activated solely in the vehicle drive system 10.

First, in step S100, the abovementioned monitor circuit 24c included in the second ECU 24 determines whether or not the interlock line 50 is disconnected. As has been already described above, the interlock line 50 is disconnected when the service plug 52 is removed or when the to-be-cut part is cut.

When the monitor circuit 24c detects the disconnection of the interlock line 50 in step S100, the backup power supply 26 is activated in step S102. As a result, the second ECU 24 (more specifically, the CPU 24a) is activated by electric power supplied from the backup power supply 26.

Subsequently, in step S104, the CPU 24a determines whether or not the second ECU 24 receives a discharge command to discharge residual charge in the capacitors 32, 34 from the first ECU 18. More specifically, the determination result in step S104 is affirmative in a case where the second ECU 24 receives the discharge command within a predetermined time from the detection of the disconnection of the interlock line 50, for example.

In a case where the second ECU 24 receives the discharge command in step S104 (step S104; Yes), the CPU 24a executes a normal discharge control such that residual charge in the capacitors 32, 34 is discharged, in step S106. The normal discharge control is similar to the abovementioned discharge control A except that electric power of the auxiliary battery 36 is used as normal without electric power of the backup power supply 26. When the normal discharge control is ended, the operation illustrated in FIG. 2 is ended. Note that notification in step S114 (described later) may be also executed when the normal discharge control is ended.

In the meantime, in a case where the second ECU 24 does not receive the discharge command in step S104 (step S104; No), the CPU 24a detects a residual voltage Vc in the capacitors 32, 34 based on an output from the voltage sensor 60, in step S108.

Subsequently, in step S110, the CPU 24a determines whether or not the residual voltage Vc detected in step S108 is higher than a predetermined threshold TH. The threshold TH is an upper limit (for example, a direct-current voltage of 60 V) of a voltage at which a person does not receive an electric shock even when the person touches the motor device 14, for example.

In a case where the residual voltage Vc is higher than the threshold TH in step S110, the second ECU 24 (the CPU 24a) controls the PCU 22 such that the PCU 22 executes the abovementioned discharge control A, in step S112. After that, the CPU 24a returns to step S108 and detects the residual voltage Vc. While the residual voltage Vc detected in step S108 is higher than the threshold TH during the execution of the discharge control A, the processes of steps S108 to S112 are executed repeatedly.

In the meantime, in a case where the residual voltage Vc detected in step S108 decreases to be equal to or less than the threshold TH during the execution of the discharge control A, the CPU 24a performs notification by the notification device 70 in step S114. The notification is performed to inform people (for example, the operator at the time of rescue) around the electrified vehicle that residual charge in the motor device 14 (more specifically, the PCU 22) is removed. Subsequently, in step S116, the CPU 24a turns off the backup power supply 26. Hereby, the discharge control A is ended.

Further, in a case where the residual voltage Vc detected for the first time in step S108 after the disconnection of the interlock line 50 is detected is equal to or less than the threshold TH, the process also advances to steps S114 and S116. In this case, it is determined that the execution of the discharge control A is unnecessary, and the discharge control A is not executed.

3. Effects

As described above, in the present embodiment, in a case where the interlock line 50 is disconnected, the second ECU 24 in the motor device 14 is activated by electric power from the backup power supply 26 activated along with the disconnection. Then, under the condition that the second ECU 24 does not receive a discharge command from the first ECU 18, the second ECU 24 controls the PCU 22 such that the PCU 22 executes the discharge control A. In other words, in the present embodiment, the interlock signal changing in response to the disconnection of the interlock line 50, performed by the operator at the time of rescue, is utilized, and the discharge control A is executed solely in the motor device 14 (that is, with a minimum system configuration) that uses electric power from the backup power supply 26 provided in the motor device 14 even without the discharge command.

Hereby, even when the power supply to the first ECU 18 is not performable or the first ECU 18 is damaged under the influence of a collision, for example, residual charge in the motor device 14 (the PCU 22) can be discharged more surely before the operator starts operation, with the disconnection of the interlock line 50, performed at the time of rescue, as a trigger. Even when normal power supply (for example, power supply from the auxiliary battery 36) to the second ECU 24 is stopped under the influence of a collision, discharge can be performed more surely by use of the backup power supply 26. As a result, the operator can perform rescue operation more safely after the collision.

Further, in the present embodiment, in a case where the residual voltage Vc is equal to or less than the threshold TH after the interlock line 50 is disconnected, notification to notify that residual charge in the motor device 14 (more specifically, the PCU 22) is removed is performed. Hereby, the operator can easily grasp the removal of residual charge at the time of rescue.

4. Another Example of Operation in Rescue

Figure 3:
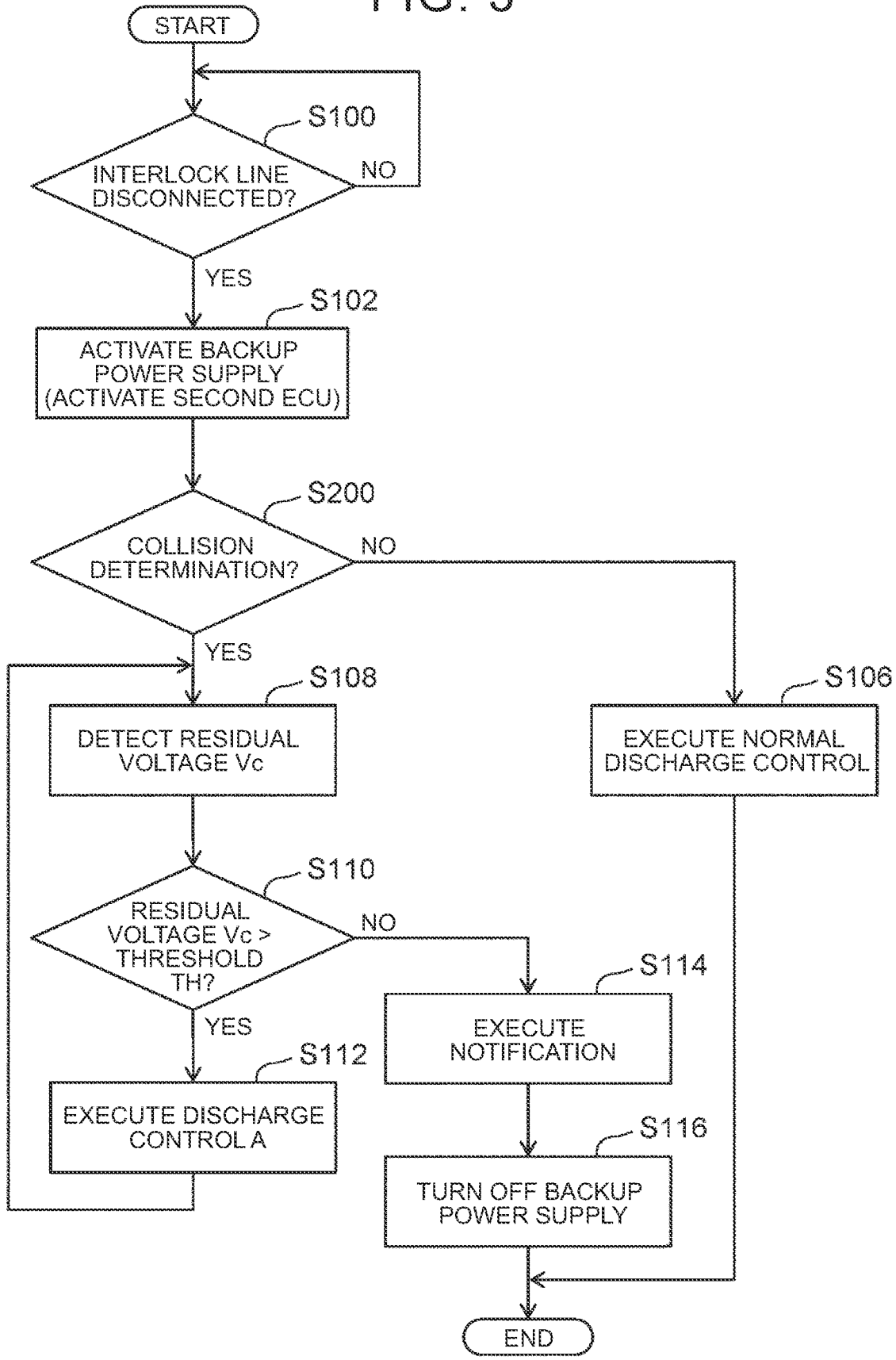
FIG. 3 is a flowchart illustrating another example of the procedure of the operation at the time of rescue according to the embodiment.

FIG. 3 is a flowchart illustrating another example of the procedure of the operation at the time of rescue according to the embodiment. The operation illustrated in this flowchart is also performed by the motor device 14 activated solely in the vehicle drive system 10. The following describes differences in this flowchart from the flowchart illustrated in FIG. 2.

In FIG. 3, the process of step S200 is executed instead of step S102. In step S200, the second ECU 24 (the CPU 24a) determines whether or not a determination (a collision determination) that the electrified vehicle has a collision is made. The collision determination by the second ECU 24 can be made by, for example, the technique described in JP 2018-007426 A. The outline of the technique is as follows.

That is, whether or not the collision determination is made is determined at the time of the occurrence of the collision based on a change in an output pattern from the current sensor 62 (in other words, a pattern of the current of the battery 12, detected by the current sensor 62). More specifically, when the second ECU 24 receives a collision detection signal from the airbag ECU 38 directly or via the first ECU 18, the second ECU 24 changes the operation of the converter 30 included in the PCU 22. The change in the operation corresponds to a change in an operation frequency of a switching element in the converter 30, for example. When the operation of the converter 30 is changed as such, the current sensor 62 detects a current pattern at the time of a collision, the current pattern being different from a current pattern in normal times when no collision occurs. When the second ECU 24 detects a change from the current pattern in normal times to the current pattern at the time of the collision by use of the current sensor 62, the second ECU 24 makes the collision determination, and when the second ECU 24 does not detect the change, the second ECU 24 determines that no collision occurs. Information indicative of a result of the determination (that is, whether or not the collision determination is made) performed when a collision occurs (more specifically, just after the collision occurs) is stored in a storage device of the second ECU 24.

In FIG. 3, in a case where the collision determination is made at the time when the collision occurs in step S200, the process advances to step S108. As a result, by use of the backup power supply 26, the motor device 14 executes the discharge control A solely. In the meantime, in a case where the collision determination is not made, the process advances to step S106. As a result, when the operation to stop a vehicle system including the vehicle drive system 10 is performed by the operator, the normal discharge control is performed by use of electric power from the auxiliary battery 36.

With the operation at the time of rescue, illustrated in FIG. 3 described above, in a case where the interlock line 50 is disconnected, the second ECU 24 in the motor device 14 is activated by electric power from the backup power supply 26 activated along with the disconnection. Then, under the condition that the collision determination is made, the second ECU 24 controls the PCU 22 such that the PCU 22 executes the discharge control A. In other words, even in the operation illustrated in FIG. 3, the interlock signal changing in response to the disconnection of the interlock line 50, performed by the operator at the time of rescue, is utilized. The motor device 14 itself using electric power from the backup power supply 26 provided in the motor device 14 (that is, a minimum system configuration) determines whether or not a collision occurs, and when the collision occurs, the discharge control A is executed.

With the operation illustrated in FIG. 3, it is also possible to achieve an effect similar to that of a case where the operation illustrated in FIG. 2 is performed.

What is claimed is:

1. A vehicle drive system comprising:
a battery;
a motor device connected to the battery;
a relay configured to switch between electrical connection and disconnection of the battery with the motor device; and
a first electronic control unit configured to control the relay such that the electrical connection is disconnected, in at least either a case where the first electronic control unit receives a collision detection signal indicative of detection of a collision in an electrified vehicle or a case where an interlock line to be disconnected by an operator to stop power supply from the battery to the motor device is disconnected, wherein:
the motor device includes
an electric motor for traveling,
a power control unit including one or more capacitors and configured to control electric power to be supplied from the battery to the electric motor for traveling,
a second electronic control unit configured to control the power control unit, and
a backup power supply;
in a case where the interlock line is disconnected, the second electronic control unit is activated by electric power supplied from the backup power supply activated along with the disconnection; and
under condition that the second electronic control unit does not receive, from the first electronic control unit, a discharge command to discharge residual charge in the one or more capacitors or that a determination that the collision occurs is made, the second electronic control unit controls the power control unit such that the power control unit executes a discharge control by which the residual charge is discharged.

2. The vehicle drive system according to claim 1, wherein the interlock line includes a service plug to be removed by the operator for the disconnection or a to-be-cut part to be cut by the operator for the disconnection.

3. The vehicle drive system according to claim 1, wherein the interlock line is placed in a power train compartment in which a power train including the motor device is stored.

4. The vehicle drive system according to claim 1, further comprising a voltage sensor configured to detect a residual voltage in the one or more capacitors, wherein, when the residual voltage is equal to or less than a threshold, the second electronic control unit does not execute the discharge control.

5. The vehicle drive system according to claim 1, further comprising a voltage sensor configured to detect a residual voltage in the one or more capacitors, wherein:
the electrified vehicle includes a notification device; and
when the residual voltage is equal to or less than a threshold, the second electronic control unit controls the notification device such that the notification device notifies that the residual charge is removed.

* * * * *